US012596268B2

(12) United States Patent
Morel et al.

(10) Patent No.: US 12,596,268 B2
(45) Date of Patent: Apr. 7, 2026

(54) METHOD OF CALCULATING A FINISHED LENS

(71) Applicant: Essilor International, Charenton-le-Pont (FR)

(72) Inventors: Florence Morel, Charenton-le-Pont (FR); Thierry Baudart, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 768 days.

(21) Appl. No.: 17/760,268

(22) PCT Filed: Feb. 8, 2021

(86) PCT No.: PCT/EP2021/052919
§ 371 (c)(1),
(2) Date: Aug. 5, 2022

(87) PCT Pub. No.: WO2021/156499
PCT Pub. Date: Aug. 12, 2021

(65) Prior Publication Data
US 2023/0077232 A1 Mar. 9, 2023

(30) Foreign Application Priority Data
Feb. 7, 2020 (EP) ..................................... 20305114

(51) Int. Cl.
*G02C 7/02* (2006.01)
(52) U.S. Cl.
CPC ............. *G02C 7/028* (2013.01); *G02C 7/021* (2013.01); *G02C 7/024* (2013.01); *G02C 2202/08* (2013.01)

(58) Field of Classification Search
CPC .... G02C 7/028; G02C 7/021; G02C 2202/08; G02C 7/024; G02C 7/027; B29D 11/00009
See application file for complete search history.

(56) References Cited

U.S. PATENT DOCUMENTS

| | | | |
|---|---|---|---|
| 10,345,618 B1 | 7/2019 | Rego et al. | |
| 2006/0188255 A1 | 8/2006 | Akiyama | |
| 2009/0109397 A1 | 4/2009 | Arrigotti et al. | |
| 2012/0013846 A1* | 1/2012 | Dursteler Lopez ..... B24B 49/00 |
| | | | 351/159.76 |

(Continued)

FOREIGN PATENT DOCUMENTS

| | | |
|---|---|---|
| CN | 1921980 A | 2/2007 |
| CN | 104470680 A | 3/2015 |

(Continued)

OTHER PUBLICATIONS

Extended European Search Report issued Jul. 28, 2020, in EP 20305114.9, 10 pages.

(Continued)

*Primary Examiner* — Thomas K Pham
*Assistant Examiner* — Ruby L Kauffman
(74) *Attorney, Agent, or Firm* — Oblon, McClelland, Maier & Neustadt, L.L.P.

(57) ABSTRACT

A finished lens with a predetermined shape, including one front face, one back face and a perimeter corresponding to the shape, including a prescription part on the lens that together with the front face fulfills prescription data of a wearer and a peripheral part on the lens, the prescription part being delimited by a thickness curve and the peripheral part extending from the thickness curve towards an outer edge of the lens, the thickness curve corresponding to a value of thickness less than or equal to a predetermined thickness requirement.

8 Claims, 6 Drawing Sheets

(56) References Cited

U.S. PATENT DOCUMENTS

Figure 1A:
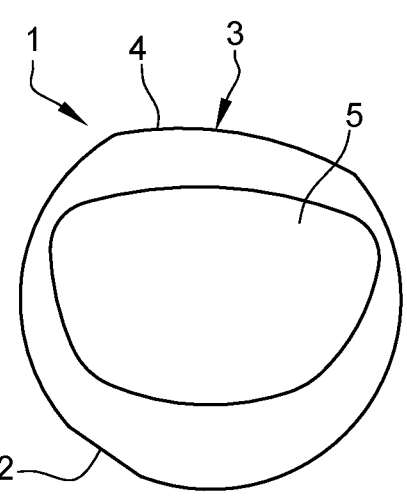

| | | | |
|---|---|---|---|
| 2013/0063697 A1* | 3/2013 | Lafon | G02C 7/02 |
| | | | 351/159.76 |
| 2013/0107205 A1* | 5/2013 | Weatherby | G02C 7/027 |
| | | | 351/159.75 |
| 2015/0138501 A1 | 5/2015 | Baudart et al. | |
| 2015/0338680 A1* | 11/2015 | Spratt | G02C 7/024 |
| | | | 351/159.76 |
| 2020/0041815 A1 | 2/2020 | Gromotka | |
| 2020/0230775 A1 | 7/2020 | Rego et al. | |
| 2020/0282507 A1 | 9/2020 | Spratt et al. | |

FOREIGN PATENT DOCUMENTS

| | | | | | |
|---|---|---|---|---|---|
| CN | 105182530 A | 12/2015 | | | |
| CN | 105283800 A | 1/2016 | | | |
| CN | 109073913 A | 12/2018 | | | |
| EP | 2 236 244 A1 | 10/2010 | | | |
| EP | 2 343 154 A1 | 7/2011 | | | |
| EP | 2947505 A1 * | 11/2015 | ......... | G02B 27/0012 |
| JP | 2011-22292 A | 2/2011 | | | |
| WO | WO-2019106112 A1 * | 6/2019 | ......... | B24B 13/0037 |

OTHER PUBLICATIONS

International Search Report Issued Apr. 9, 2021, in PCT/EP2021/052919, filed on Feb. 8, 2021, 4 pages.
Combined Chinese Office Action and Search Report issued Jan. 15, 2024 in Chinese Patent Application No. 202180012534.4 (with English Translation), 20 pages.
Combined Chinese Office Action and Search Report issued Jan. 9, 2026 in Chinese Patent Application No. 202180012534.4, 5 pgs.

* cited by examiner

Fig. 2D

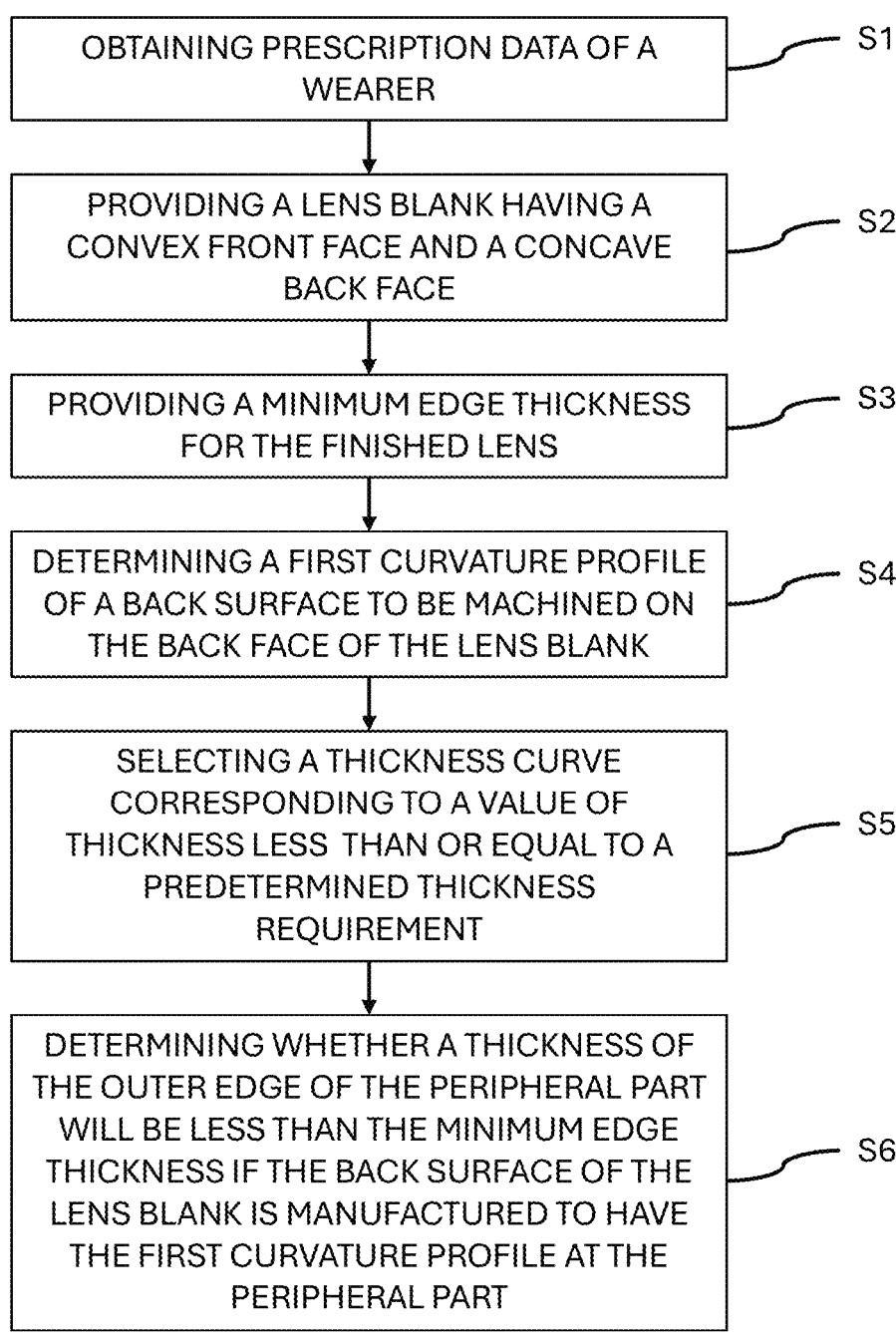

OBTAINING PRESCRIPTION DATA OF A WEARER — S1

PROVIDING A LENS BLANK HAVING A CONVEX FRONT FACE AND A CONCAVE BACK FACE — S2

PROVIDING A MINIMUM EDGE THICKNESS FOR THE FINISHED LENS — S3

DETERMINING A FIRST CURVATURE PROFILE OF A BACK SURFACE TO BE MACHINED ON THE BACK FACE OF THE LENS BLANK — S4

SELECTING A THICKNESS CURVE CORRESPONDING TO A VALUE OF THICKNESS LESS THAN OR EQUAL TO A PREDETERMINED THICKNESS REQUIREMENT — S5

DETERMINING WHETHER A THICKNESS OF THE OUTER EDGE OF THE PERIPHERAL PART WILL BE LESS THAN THE MINIMUM EDGE THICKNESS IF THE BACK SURFACE OF THE LENS BLANK IS MANUFACTURED TO HAVE THE FIRST CURVATURE PROFILE AT THE PERIPHERAL PART — S6

METHOD OF CALCULATING A FINISHED LENS

The invention relates to a method of calculating a finished lens and the related systems and lenses.

An optical lens concerned by such a method has one concave face and one convex face and an outer perimeter, where the outer perimeter has a thickness within a preestablished range.

An optical lens is generally manufactured from a semi-finished lens blank. A semi-finished lens blank generally has two opposing major surfaces at least one of which is unfinished. The unfinished surface is typically the surface corresponding to the back surface of the optical lens which, in use, is orientated towards the eye of a wearer. The unfinished surface of the semi-finished lens blank is machined according to the wearer's prescription to provide the required back surface of the optical lens. Prior to machining of the back surface, the diameter of the blank typically is reduced by cutting to a shape e. g. round or ellipsoidal, which cutting process is known as cribbing.

An optical lens having finished back and front surfaces is often referred to as an uncut optical lens or finished lens. The finished lens is then edged according to a shape of a frame on which the optical lens is to be mounted in order to obtain an edged or cut lens.

Figure 1B:
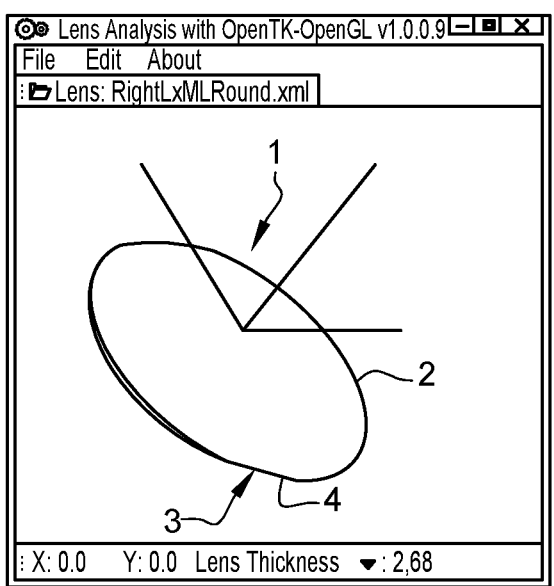
Figure 3:
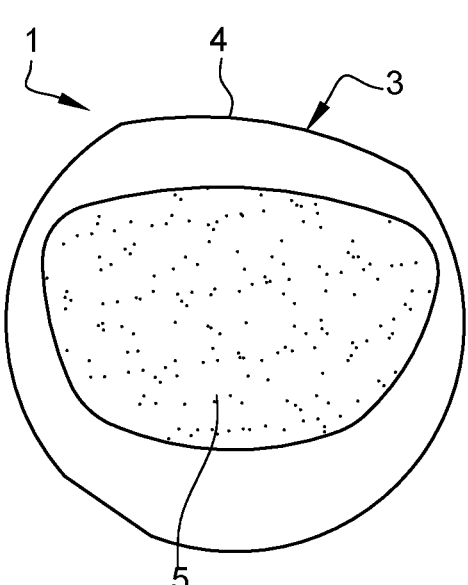

Referring to FIGS. 1A, 1B and 3, by machining the unfinished back surface of the semi-finished lens blank so that it fulfills a particular preestablished prescription, there may be problems with the thickness of the outer perimeter 2 of the finished lens. Indeed, it is possible that the thickness may be excessively fine, and even that it may be null or negative, which means that the outer perimeter 2 of the finished lens, once it has been machined, is no longer circular, has recesses 3 and result in formation of local sharp edge 4 at the outer perimeter of the finished lens.

Sharp edge 4 is disadvantageous in that it is prone to cracking or chipping resulting in one or both of contamination of subsequent cleaning or coating steps of the manufacturing process and an unusable finished lens.

Additionally, the sharp edge 4 damages the polishing tools during the polishing step of the manufacturing process.

Additionally, the sharp edge 4 makes the finished lens harder to handle either manually or by machine and is likely to cause injuries to a person who would handle said finished lens.

Finally, finished lenses with sharp edges 4 are more likely to exhibit coating defects such as for example some anti reflective coating not correctly coated on the finished lens and be rejected as unacceptable from a cosmetic basis.

Indeed, the suppression of such sharp edges 4 is interesting for the following reasons:

Avoiding to damage some tools such as, for example, polishing tools on the sharp parts of the finished lens, Allowing the automation of the manufacturing method by reducing the shapes diversity of the finished lens to be handled, Facilitating the handling of the finished lens, Reducing the edge fragility, Improving the esthetic of the finished lens to be delivered.

Known solutions are related to a method tending to remove the sharp edge of a finished lens by knowing the shape of the frame on which the optical lens is intended to be mounted. The finished lens has a thickness within a pre-established range, a central useful area that fulfils a particular pre-established ophthalmic prescription, which defines a machined surface, and which has a useful perimeter that coincides with the perimeter of a particular pre-established frame, and an outer transition area that joins the useful perimeter of central useful area to outer perimeter.

More globally, during the lens manufacturing process, marking of lens handling clips in the useful part of the lenses may appear as well as drop of varnish in the useful part of the lenses.

In addition, lenses may be rejected for defaults that only appear in the non useful part of the lenses that will be finally edged.

There is a need to optimise cosmetic control rejection and varnish coating process during the manufacturing of lenses.

Furthermore, a method pursuant to the invention allows to avoid the presence of sharp edge in a finished lens, free of the constraints to use the shape of the frame on which the optical lens is intended to be mounted, while guaranteeing to the cribbed finished lens a shape whose geometry is mastered.

A first object of the invention is a computer implemented method of calculating a finished lens with a predetermined shape, comprising one front face, one back face and a perimeter corresponding to said shape, comprising the following steps:

Providing a lens blank having a convex front face and a concave back face,

Determining, free of frame shape data into which the lens is to be mounted, a prescription part on the lens that together with the front face fulfills prescription data of a wearer and a peripheral part on the lens by determining a first curvature profile of a back surface to be machined on the back face of the lens blank, and by determining a thickness curve corresponding to a value of thickness less than or equal to a predetermined thickness requirement, the prescription part being delimited by the thickness curve and the peripheral part extending from the thickness curve towards an outer edge of the lens.

The principle of this method pursuant to the invention lies in the determination of thickness curves in the finished lens, then in a choice of a suitable thickness curve determining a prescription part and a peripheral non useful part of the lens without using the frame shape intended to receive the useful part of the optical lens, the prescription part surrounding the useful part of the optical lens intended to be mounted on a frame.

The term "useful part" refers to the lens part which will be machined in the optical lens and which will have the final suitable shape to be mounted on a frame.

According to a possible characteristic of the invention, the method further includes a step of optimizing the orientation of the finished lens during a varnish coating step.

According to a possible characteristic of the invention, varnish basket orientation markings in the peripheral part of the lenses are defined.

A second object of the invention is a finished lens with a predetermined shape, comprising one front face, one back face and a perimeter corresponding to said shape, comprising a prescription part on the lens that together with the front face fulfills prescription data of a wearer and a peripheral part on the lens, the prescription part being delimited by a thickness curve and the peripheral part extending from the thickness curve towards an outer edge of the lens, the thickness curve corresponding to a value of thickness less than or equal to a predetermined thickness requirement.

A third object of the invention is a computer implemented method of calculating a finished lens with a predetermined shape, comprising one front face, one back face and a perimeter corresponding to said shape, comprising the following steps:

Providing a lens blank having a convex front face and a concave back face,

Providing a minimum edge thickness for the finished lens,

Determining a first curvature profile of a back surface to be machined on the back face of the lens blank, Determining, free of frame shape data into which the lens is to be mounted, a prescription part on the lens that together with the front face fulfills prescription data of a wearer and a peripheral part on the lens by determining a thickness curve corresponding to a value of thickness less than or equal to a predetermined thickness requirement, the prescription part being delimited by the thickness curve and the peripheral part extending from the thickness curve towards an outer edge of the lens Determining whether a thickness of the outer edge of the peripheral part of that lens blank machined on the back face with the first curvature profile at the peripheral part will be less than the minimum edge thickness if the back surface of the back face of the lens blank is manufactured using the first curvature profile at the peripheral part If the thickness of outer edge of the peripheral part will be less than the minimum edge thickness, determining a new curvature profile of the peripheral part of the back surface to be machined wherein the thickness in the peripheral part is greater or equal the minimum edge thickness in order to avoid sharp edge.

The principle of a method pursuant to the invention lies in the determination of thickness curves in the finished lens, then in a choice of a suitable thickness curve surrounding the useful part of the optical lens intended to be mounted on a frame, and finally in a determination of an optimized curvature profile at the peripheral part of the back surface to be machined situated around the prescription part delimited by said thickness curve, if the algorithm detects the presence of a potential sharp edge.

The choice of the thickness curve is made, without using the frame shape data intended to receive the useful part of the optical lens.

A method pursuant to the invention presents the advantage to manufacture optical lenses without any sharp edge and without exactly knowing the frame on which the finished lenses are intended to be mounted or without using this last information.

According to a possible characteristic of the invention, the predetermined thickness requirement corresponds to an edge thickness of the lens cut provided during an ordering of the finished lens.

According to a possible characteristic of the invention, the thickness curve is an isothickness curve.

According to a possible characteristic of the invention, a local or global safety margin is applied to the thickness curve in order to define the thickness curve delimiting the prescription part and the peripheral part of the lens.

According to a possible characteristic of the invention, the minimal edge thickness is preferably greater than or equal to 0.4 mm. With such a thickness value we can estimate that the outer edge of the lens is no longer sharp.

According to a possible characteristic of the invention, the predetermined shape of the optical lens is to be chosen among an elliptical shape, a circular shape or an optimized shape. These kinds of shape aim to facilitate for example the handling of lenses or the coating processes to avoid coating defects on the lenses.

According to a possible characteristic of the invention the determination of the new curvature profile of the peripheral part of the back surface to be machined is weighed to take into account a manufacturing requirement function.

According to a possible characteristic of the invention, the step of determining a new curvature profile of the peripheral part of the back surface to be machined is based on an interpolation method of soundly distributed points.

According to a possible characteristic of the invention, the step of determining a new curvature profile of the peripheral part of the back surface to be machined comprises the following steps:

Sampling of a first set of points which are internal to the chosen thickness curve, Sampling of a second set of points which are different from the first points and which are situated on the outer edge, Change of the altitude of the second points so that the thickness corresponding to said second points is greater than or equal to the minimal predetermined thickness, Calculation of a back surface constituted by sampled points on the interpolating for the points out of the thickness curve and the sampled points on the initial surface when the latest are inside or on the chosen thickness curve.

According to a possible characteristic of the invention, the method comprises a step of optimization of the position and/or orientation and/or the size of identified sharp edges zones at the peripheral part of the back surface of the back face of the lens wherein the curvature profile have to be modified.

According to a possible characteristic of the invention, the method comprises the following steps:

Determining a cribbed diameter $D_{cribb}$ of the finished lens,

Determining the best position for the cribbing diameter in order to minimize overlapping areas between said cribbing diameter and a predetermined thickness curve and/or to minimize the curvature of the back surface in the peripheral part.

Another object of the invention is a method for manufacturing an optical lens comprising a step of edging the finished lens determined by using the methods as disclosed above.

According to a possible characteristic of the invention, the method further includes a step of engraving manufacturing marks in the peripheral part of the lens.

According to a possible characteristic of the invention, the method further includes a step of optimizing a lens cosmetic control step.

According to a possible characteristic of the invention, during the cosmetic control step, the location of a cosmetic default in the lens is determined and if the default is detected in the peripheral part of the lens, the lens is not rejected as having a cosmetic default.

Another object of the invention is a computer program product comprising program code for carrying out the steps of a method as disclosed above, when the computer program product is run on a data processing device.

Another object of the invention is a computer-readable medium carrying one or more sequences of instructions of the computer program product.

Another object of the invention is a finished lens with a predetermined shape, comprising one front face, one back face and a perimeter corresponding to said shape, comprising a prescription part on the lens that together with the front face fulfills prescription data of a wearer and a peripheral part on the lens, the prescription part being delimited by a thickness curve and the peripheral part extending from the thickness curve towards an outer edge of the lens, the thickness curve corresponding to a value of thickness less than or equal to a predetermined thickness requirement. Such finished lens may be preferably obtained by a computer implemented method according to the invention.

Unless specifically stated otherwise, as apparent from the following discussions, it is appreciated that throughout the specification discussions utilizing terms such as "calculating", «determining», "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. In addition, embodiments of the present invention are not described with reference to any particular programming language. It will be appreciated that a variety of programming languages may be used to implement the teachings of the inventions as described herein.

Figure 2A:
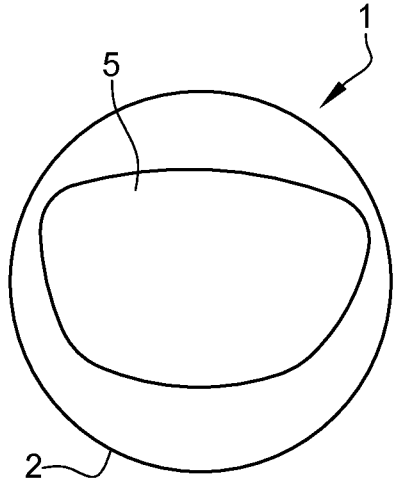
Figure 2B:
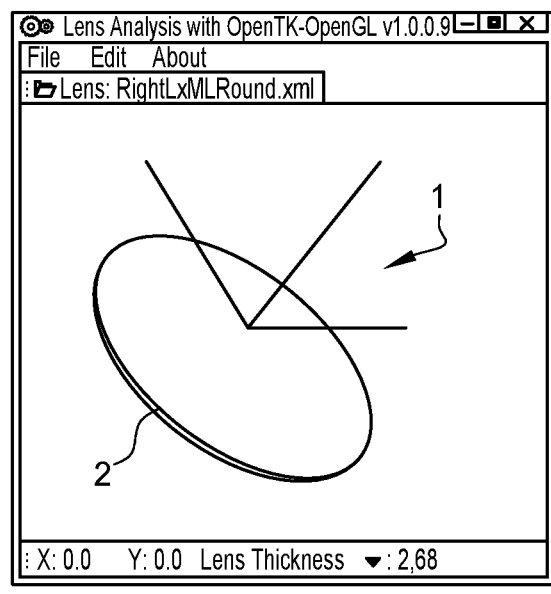
Figure 2C:
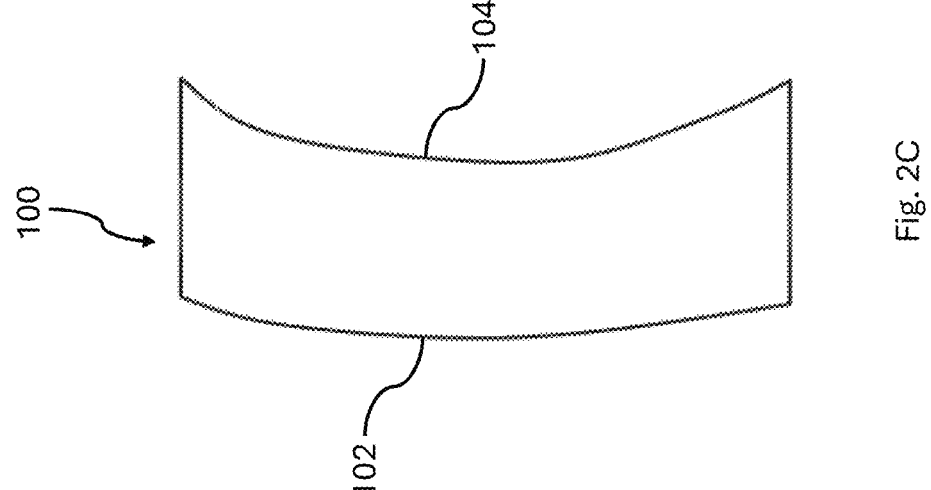
Figure 4:
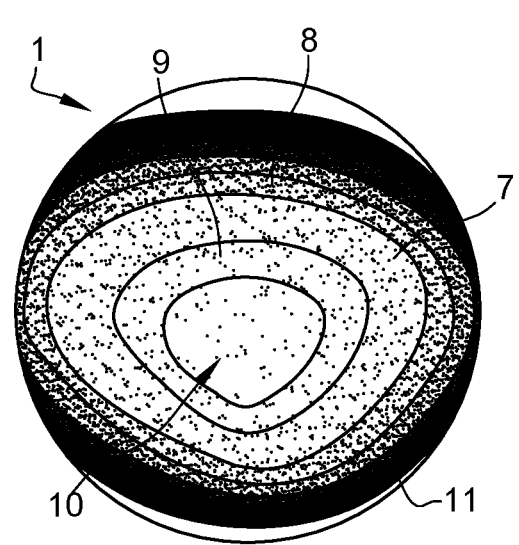
Figure 5A:
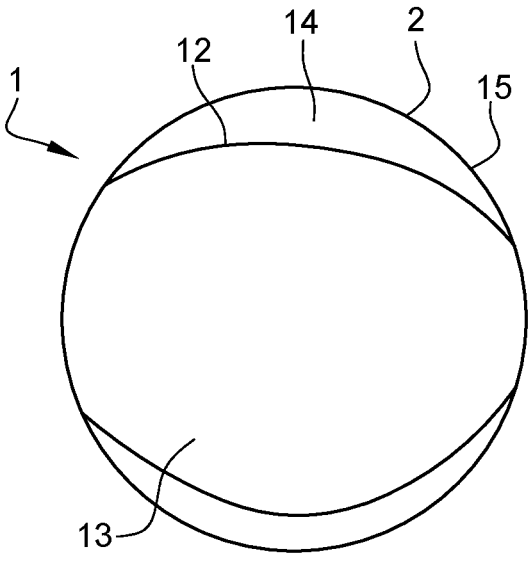
Figure 5B:
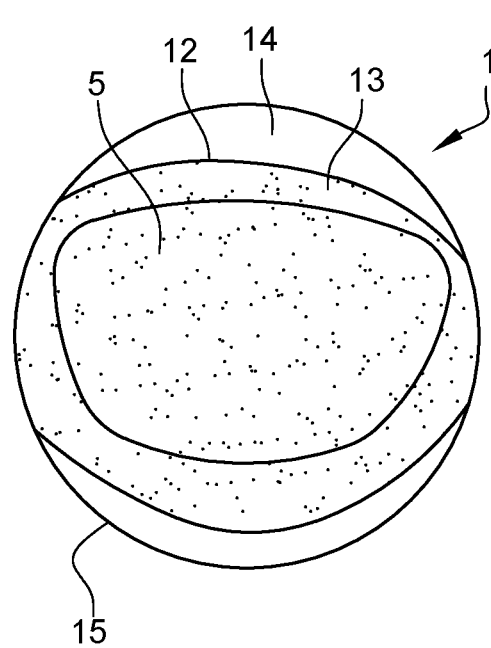
Figure 6A:
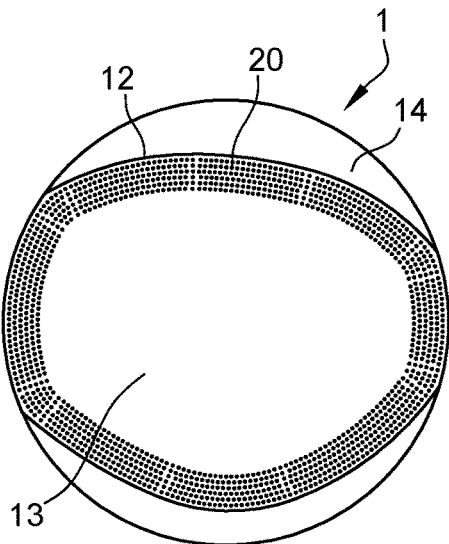
Figure 6B:
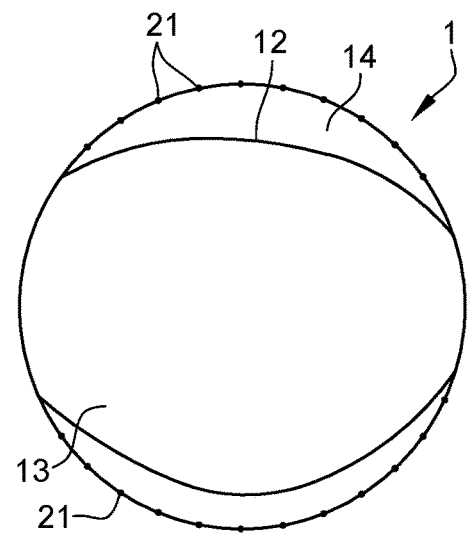
Figure 6C:
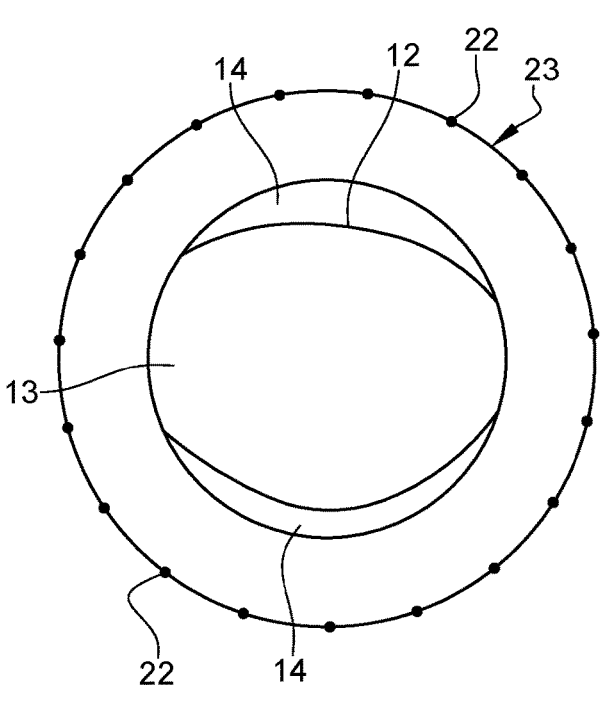
Figure 6D:
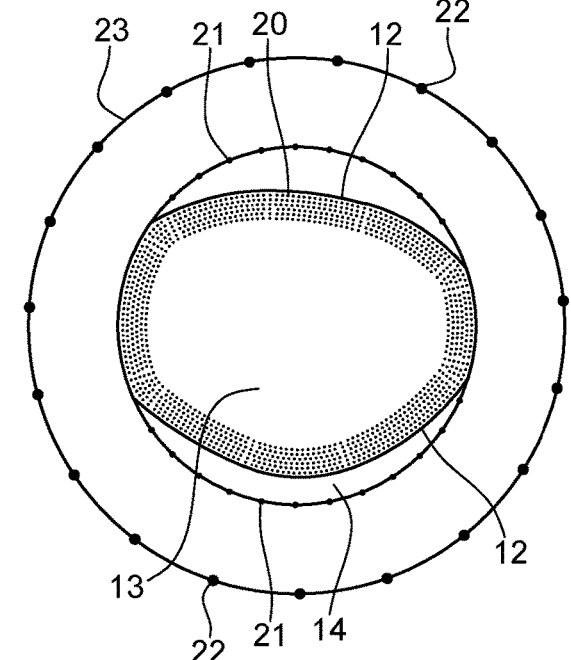
Figure 7:
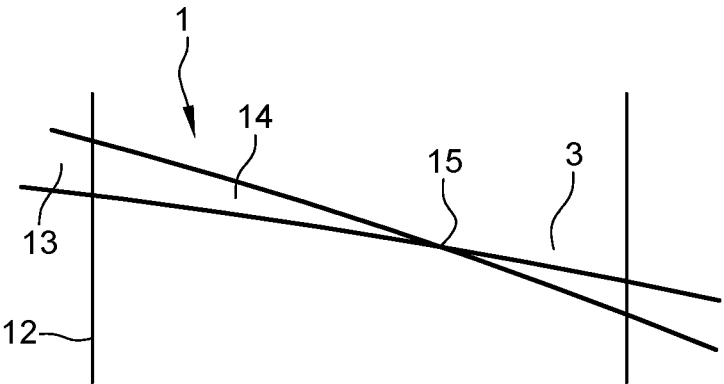
Figure 8:
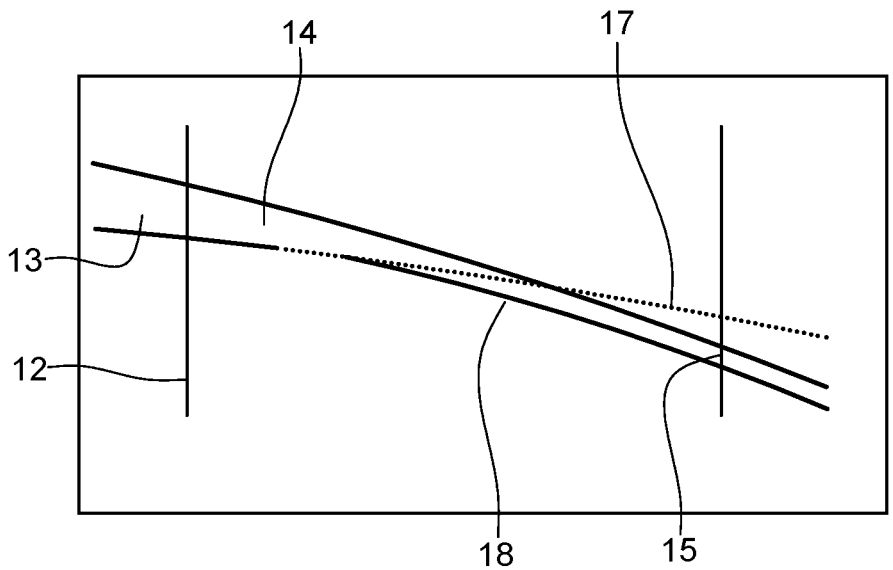

We give hereafter a detailed description of embodiments of a method pursuant to the invention, by referring to the following pictures:

FIGS. 1A and 1B are respectively a front view and a perspective view of a finished lens having a sharp edge, FIGS. 2A and 2B are respectively a front view and a perspective view of a finished lens having a non-sharp edge, FIG. 2C is a schematic sectional view of a lens blank having a convex front face and a concave back face, FIG. 2D is a flowchart showing steps of a method pursuant to the invention, FIG. 3 is a front view of a finished lens having a sharp edge and showing a central area delimiting the perimeter of a useful part of the optical lens intended to be mounted on a frame, FIG. 4 is a front view of a finished lens showing iso-thickness distribution through the lens, FIGS. 5A and 5B are front views of a finished lens showing respectively an example of a chosen iso-thickness curve and said chosen iso-thickness curve included the useful part of the optical lens intended to be mounted on a frame, FIGS. 6A, 6B, 6C and 6D are four front views of a finished lens illustrating four steps of an embodiment of interpolation method included in a method pursuant to the invention, FIG. 7 is a diagram giving the thickness of the finished lens versus a sector of a diameter of said lens showing a sharp edge, FIG. 8 is the diagram of FIG. 7 after a correction and showing an outer edge of the finished lens with a minimal thickness.

Referring to FIGS. 2A, 2B, 7 and 8, a method pursuant to the invention aims to provide a finished lens 1 with a predetermined shape with an outer edge 15 which is not sharp but having a minimal edge thickness. Such a finished lens 1 has a rear face (or a concave face) and a front face (or a convex face) and its thickness decreases from a central area to a outer edge 15. The predetermined shape of the finished lens (1) may to be chosen among an elliptical shape, a circular shape and any optimized shape.

The finished lens 1 must integrally comprise a useful part 5 which is intended to be mounted on a predetermined frame Referring to FIG. 2D, according to a method pursuant to the invention, the method comprises the following steps:

S1: Obtaining prescription data of a wearer,

S2: Providing a lens blank 100 (see FIG. 2C) having a convex front face 102 and a concave back face 104, S5: Selecting a thickness curve corresponding to a value of thickness less than or equal to a predetermined thickness requirement, this curve defining:

an outer perimeter of a prescription part 13 of the back surface to be machined on the back face of the finished lens 1 that together with the front surface of the front face of the lens blank 100 fulfills the prescription data of the wearer and a peripheral part 14 on the back surface to be machined on the back face 104 of the lens blank 100 extended from the thickness curve towards the outer edge 15 of the finished lens 1

In addition, in one embodiment, the method comprises the following steps:

S3: Providing a minimum edge thickness for the finished lens 1,

S4: Determining a first curvature profile of a back surface to be machined on the back face 104 of the lens blank 100, S6: Determining whether a thickness of the outer edge 15 of the peripheral part 14 will be less than the minimum edge thickness if the back surface of the lens blank 100 is manufactured to have the first curvature profile at the peripheral part 14.

If the thickness of the outer edge 15 of the peripheral part 14 will be less than the minimum edge thickness and thus the outer edge 15 is sharp, determining an optimised curvature profile of the peripheral part 14 of the back surface to be machined wherein the thickness in the peripheral part 14 is greater or equal the minimum edge thickness so as to obtain the outer edge 15 having a minimal thickness and which is preferably no longer sharp.

In step S3, the minimum edge thickness $Te_{min}$ is provided. The minimum edge thickness $Te_{min}$ is the minimum edge thickness requested at the outer edge 15 of the finished lens 1 to be produced from the lens blank. The value of the minimum edge thickness $Te_{min}$ is preferably chosen to avoid any sharp edge at the outer edge 15 of the finished lens 1 and provide finished lens with predetermined shape.

Preferably, the minimum edge thickness $Te_{min}$ is greater than or equal to 0.4 mm.

In step S5, the thickness curve 12 corresponding to a value of thickness less than or equal a predetermined thickness requirement Tr is determined and in the back surface of the back face of the lens the prescription part 13 and the peripheral part 14 are defined.

In one embodiment of the invention, the predetermined thickness requirement Tr may be the value of the outer edge thickness of the lens cut. This data may be provided during ordering of the optical lens.

Preferably, the predetermined thickness requirement Tr is greater than or equal to 0.8 mm.

In order to define the thickness curve 12, the method pursuant to the invention comprises a thickness determining step wherein the thickness of the lens 1 which back surface is to be machined at several points is determined.

The thickness is defined by the front and back surface and the distance between the faces at a given point of these surfaces.

The values of thickness may be determined by any known method in any convenient coordinate system by any known lab management system.

In one embodiment of the invention, in a first substep, a map of iso-thickness curves 7, 8, 9 in the finished lens 1 is established. Indeed, by knowing the geometry of the finished lens 1 and, in particular, the back surface of the back face to be machined it is possible to establish a cartography of the iso-thickness curves 7, 8, 9 in said lens 1. The distribution of thickness in the lenses is illustrated in FIG. 4. The greatest thickness of the finished lens 1 is located in a central area 10 of said lens 1, while the thinnest thickness of said lens 1 is located in a peripheral area 11, the thickness decreasing from said central area 10 to said peripheral edge 11.

In a second substep, a iso-thickness curve 12 as illustrated in FIG. 5A corresponding to a given thickness is chosen.

In one embodiment, the iso-thickness curve 12 is chosen so as to correspond to a value which is less than or equal to the predetermined thickness requirement Tr that correspond to the minimal thickness required on the edge of the lens cut.

In another embodiment, the chosen iso-thickness curve 12 is defined based on an adjustable value depending on the type of frame intended to receive the the cut lens.

Referring to FIG. 5B, this suitable iso-thickness curve 12 delimits the prescription part 13 which must include the useful part 5 of the optical lens 1 intended to be mounted on a predetermined frame and the peripheral part 14 that extend toward the outer edge 15 of the finished lens 1.

On the example illustrated on FIG. 5B, the chosen suitable iso-thickness curve 12 surrounds the useful part 5 of the optical lens 1, by keeping a minimal distance with said useful part 5.

The inventors have identified that when using thickness curves based on thickness required on the edge of the cut lens or type of frame data, the useful part 5 of the lens is always included in the prescription part 13 of the finished lens 1.

According to the invention, the useful part data 5 and/or frame shape data defining the contour of the spectacle frame are not used to define the prescription part 13 and the peripheral part 14 of the back surface of the back face of the finished lens. This means that the determination of the two different parts is free of frame shape data into which the finished lens 1 when cut is to be mounted.

In one embodiment not illustrated, a safety margin may be provided to the thickness curve 12. In this case, the thickness curve 12 selected to define the outer perimeter of the prescription part 14 is modified locally or globally to include in its contour points wherein the thickness is less than the thickness requirement Tr. The advantage is to ensure that the useful part 5 of the cut lens is not distorted in the frame contour.

In a next step, the algorithm determines if a thickness of the outer edge 15 of the peripheral part 14 is less than the minimum edge thickness $Te_{min}$ when the back surface of the lens blank is manufactured with the first curvature profile.

If the algorithm detects that the outer edge 15 of the peripheral part 14 will be less than the minimum edge thickness $Te_{min}$ and thus is too thin and thus is sharp, as illustrated on the example of FIG. 7, a step to determine an optimised curvature profile of the peripheral part 14 of the back surface to be machined is performed by said algorithm. In this step, the thickness in the peripheral part 14 is modified to be greater or equal to the minimum edge thickness $Te_{min}$ so as to obtain an outer edge 15 with a minimal predetermined thickness, as illustrated on the example of FIG. 8.

This minimal thickness can be for example 0.4 mm.

On the diagram of FIG. 8, the algorithm calculates a new machining profile or optimised curvature profile of the back surface of the back face of the finished lens 1 as illustrated by the curve 18 replacing the initial profile illustrated by the doted curve 17. In this way, the outer edge 15 has a minimal thickness and is no longer sharp. The initial profile materialized by the curve 17 shows an outer sharp edge 15 delimiting a recess 3, and the new machining profile allows to compensate this recess 3 by extending the diameter of the finished lens 1 in order to give a predetermined shape to said lens, for example circular. Consequently, the outer edge 15 which was initially sharp is displaced so as to increase the optical lens sizes, explaining the difference of outer edge 15 locations between FIG. 7 and FIG. 8.

To determine the optimised curvature profile of the peripheral part 14 of the back surface to be machined wherein the thickness of the peripheral part 14 should be greater or equal the minimum edge thickness $Te_{min}$, several methods of surface optimization or adjustment may be used under the given conditions.

The method may be any known interpolation method.

In one embodiment, the interpolation method uses a first set of points internal to the thickness curve 12 wherein the minimum edge thickness $Te_{min}$ is satisfied and a second set of points at the outer edge of the peripheral part of the finished lens wherein the minimum edge thickness $Te_{min}$ is not satisfied to optimize the thickness of the second points to provide an optimised curvature profile of the peripheral part 14 of the back surface to be machined.

In one example, the method of determining an optimised curvature profile of the peripheral part for the back surface to be machined comprises the following steps:

Sampling a first set of points 20 which are internal to the chosen iso-thickness curve 12 and which define a portion with a thickness greater or equal to the minimum edge thickness $Te_{min}$ as illustrated in FIG. 6A, In one alternative as the one illustrated in FIG. 6A, the first set of points is defined not only in the edge of the isothickness curve but also in all the surface which outer perimeter is the iso-thickness curve 12.

Sampling a second set of points 21 which are different from the first points 20 wherein the minimum edge thickness $Te_{min}$ is not satisfied and which are distributed on the outer edge 15 of the peripheral part 14 as illustrated in FIG. 6B, optimize the altitude of the second points 21 so that the thickness corresponding to said second points 21 is greater than or equal to the minimal thickness $Te_{min}$;

Calculate an optimized curvature profile of the peripheral part of the back surface constituted by sampled points on the interpolating for the points out of the iso-thickness line 12 and the sampled points on the initial back surface when the latest are inside or on the chosen iso-thickness line 12.

In one example, the second set of points may be equally distributed as illustrated in FIG. 6B.

In another embodiment, the method provides a step of sampling a third set of points 22 that describe a contour 23 having a predetermined diameter which is larger than the diameter of the finished lens 1, so as to link the interpolated back surface to the initial back surface as illustrated in FIG. 6C and a step of calculating the interpolating of these points 22 as illustrated in FIG. 6D.

In another embodiment, the determination of the optimized curvature profile of the back surface of the back face of the finished lens 1 can be weighed to take into account a manufacturing requirement function thanks to the minimum edge thickness. The latter function may define manufacturing constraints linked to the manufacturing processes used and/or related cutting tools with the authorized maximum curvature they can provide to a surface.

In addition, one or several cutting steps during the machining of the back surface of the back face of the lens 1 may be provided to define the optimized curvature profile of the back surface of the back face of the lens.

The method may further comprise a step of optimization of the zones at the peripheral part of the back face of the lens wherein the curvature profile have to be modified, called sharp edge zones, when sharp edge is identified.

This optimization may at least include the optimisation of the position and/or orientation and/or the size of the sharp edge zones at the peripheral part of the back face of the lens 1.

The optimization of the sharp edge zones of the peripheral part 14 comprises the following sub steps:

Determining a cribbed diameter $D_{cribb}$ of the finished lens,

Determining the best position for the cribbing diameter in order to minimize the overlapping areas between said cribbing diameter and a predetermined thickness curve and/or to minimize the curvature of the back surface in the peripheral part.

The determination of the cribbed diameter $D_{cribb}$ may be made by any known method.

The predetermined thickness curve may be preferably greater than or equal to 0.4 mm.

To determine the best position for the cribbing diameter, the position and/or the size of the cribbed diameter $D_{cribb}$ compared to the predetermined thickness curve may be optimised.

In one embodiment, the best position of the cribbed diameter $D_{cribb}$ is defined by iterative solutions in an appropriate coordination system.

In another embodiment, the method includes a step of optimizing the orientation of the finished lens in a varnish basket during a varnish coating step based on the definition of the peripheral part and prescription part delimited by the chosen thickness curve 12.

The optimization of the orientation of the finished lens in a varnish basket comprises the following sub steps:

Determining the location of the handling means of the varnish basket, e.g clips elements, in order to put the handling means in the peripheral part 14.

Determining the best position for the lens in order to maximize the distance between the thickness curve 12 and the handling means.

The determination of the best position may be made by any known method.

To determine the best position, the orientation of the lens may be optimised to move away the handling means from the thickness curve 12.

When the best position is defined, varnish basket orientation visible marking in the peripheral part of the lens may be defined and engraved to drive the operator during the loading of the basket.

In another embodiment, the location of the drop may further be optimized to be put in the peripheral part of the lens.

Another embodiment concerns a method for manufacturing an optical lens comprising a step of edging the finished lens determined by using the method as disclosed above.

In addition, the manufacturing method may include a step of engraving manufacturing marks in the peripheral part of the lens. Those engraving marks could be helpful during the manufacturing process or useful for the eye care professional to give him/her information about the lens. However as these marks will be cut out of the lens during the edging of the lens, they are not intended for the wearer.

In another embodiment, the manufacturing method may include a step of optimizing the cosmetic control of the lenses.

During the cosmetic control step, the location of a cosmetic default in the lens is determined and if the default is detected in the peripheral part of the lens as defined according to the methods of the invention, the lens is not rejected as having a cosmetic default since this peripheral part will be suppressed during the edging of the lens to be mounted in a frame.

The invention claimed is:

1. A system for producing a finished lens, with a predetermined shape, comprising one front face, one back face and a perimeter corresponding to said shape, the system comprising:

a non-transitory computer readable medium including instructions that, when executed on a computational device, cause the computational device to perform steps of:

providing a minimum edge thickness for the finished lens;

determining a first curvature profile of a back surface to be machined on the back face of a lens blank, the lens blank having a convex front face and a concave back face;

determining, free of frame shape data into which the lens is to be mounted, a prescription part on the lens that together with the front face fulfills prescription data of a wearer and a peripheral part on the lens by determining an isothickness curve corresponding to a value of thickness less than or equal to a predetermined thickness requirement, the prescription part being delimited by the isothickness curve and the peripheral part extending from the isothickness curve towards an outer edge of the lens;

determining whether a thickness of the outer edge of a peripheral part of that lens blank machined on the back face with the first curvature profile at the peripheral part will be less than the minimum edge thickness if the back surface of the back face of the lens blank is manufactured using the first curvature profile at the peripheral part; and if the thickness of outer edge of the peripheral part will be less than the minimum edge thickness, determining a new curvature profile of the peripheral part of the back surface to be machined wherein the thickness in the peripheral part is greater or equal to the minimum edge thickness in order to avoid sharp edges.

2. The system pursuant to claim 1, wherein a local or global safety margin is applied to the isothickness curve in order to define the isothickness curve delimiting the prescription part and the peripheral part of the lens.

3. The system pursuant to claim 1, wherein the minimum edge thickness is greater than or equal to 0.4 mm.

4. The system pursuant to claim 1, wherein the determining a new curvature profile of the peripheral part of the back surface to be machined is based on an interpolation method which uses a first set of points internal to the isothickness curve and a second set of points at the outer edge of the peripheral part of the finished lens.

5. The system pursuant to claim 1, wherein the steps further comprise the following optimization of a position and/or a size of sharp edge zones at the peripheral part of the back surface of the back face of the lens wherein the curvature profile has to be modified:

determining a cribbed diameter $D_{cribb}$ of the finished lens; and determining a best position for the cribbing diameter in order to minimize overlapping areas between said cribbing diameter and a predetermined thickness curve and/or to minimize the curvature of the back surface in the peripheral part.

6. The system pursuant to claim 1, wherein the steps further comprise optimizing orientation of the finished lens in a varnish basket during varnish coating, which comprises the following:

determining a location of handling means of the varnish basket, in order to put the handling means in the peripheral part; and determining a best position for the lens in order to maximize a distance between the isothickness curve and the handling means.

7. A method for manufacturing a finished lens, with a predetermined shape, comprising one front face, one back face and a perimeter corresponding to said shape, the method comprising:

providing a minimum edge thickness for the finished lens;

determining a first curvature profile of a back surface to be machined on the back face of a lens blank, the lens blank having a convex front face and a concave back face;

determining, free of frame shape data into which the lens is to be mounted, a prescription part on the lens that together with the front face fulfills prescription data of a wearer and a peripheral part on the lens by determining an isothickness curve corresponding to a value of thickness less than or equal to a predetermined thickness requirement, the prescription part being delimited by the isothickness curve and the peripheral part extending from the isothickness curve towards an outer edge of the lens;

determining whether a thickness of the outer edge of a peripheral part of that lens blank machined on the back face with the first curvature profile at the peripheral part will be less than the minimum edge thickness if the back surface of the back face of the lens blank is manufactured using the first curvature profile at the peripheral part;

if the thickness of outer edge of the peripheral part will be less than the minimum edge thickness, determining a new curvature profile of the peripheral part of the back surface to be machined wherein the thickness in the peripheral part is greater or equal to the minimum edge thickness in order to avoid sharp edges; and engraving manufacturing marks in the peripheral part.

8. The method pursuant to claim 7, further comprising optimizing a cosmetic control, wherein during the cosmetic control, a location of a cosmetic default in the lens is determined and if the default is detected in the peripheral part of the finished lens, the finished lens is not rejected as having a cosmetic default.

* * * * *